United States Patent
Huang et al.

(10) Patent No.: US 10,696,867 B2
(45) Date of Patent: Jun. 30, 2020

(54) THERMAL INSULATION POROUS FILM, AND METHOD FOR MANUFACTURING THE SAME

(71) Applicant: INDUSTRIAL TECHNOLOGY RESEARCH INSTITUTE, Hsinchu (TW)

(72) Inventors: Yuan-Chang Huang, Hsinchu (TW); Yi-Che Su, Zhubei (TW); Shu-Yun Chien, Hsinchu (TW); Hong-Yuan Lian, New Taipei (TW); Huai-Kuang Fu, Taichung (TW); Pang-Hung Liu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/743,228

(22) Filed: Jan. 15, 2020

(65) Prior Publication Data

US 2020/0148914 A1 May 14, 2020

Related U.S. Application Data

(62) Division of application No. 16/046,423, filed on Jul. 26, 2018.

(30) Foreign Application Priority Data

Jul. 28, 2017 (TW) .............................. 106125484 A

(51) Int. Cl.
| | | |
|---|---|---|
| C09D 183/06 | (2006.01) | |
| F16L 59/00 | (2006.01) | |
| C09D 5/00 | (2006.01) | |
| C09D 7/65 | (2018.01) | |
| C09D 183/04 | (2006.01) | |
| C09D 7/45 | (2018.01) | |
| C08G 77/20 | (2006.01) | |

(52) U.S. Cl.
CPC ............ *C09D 183/06* (2013.01); *C09D 5/00* (2013.01); *C09D 7/45* (2018.01); *C09D 7/65* (2018.01); *C09D 183/04* (2013.01); *F16L 59/00* (2013.01); *C08G 77/20* (2013.01)

(58) Field of Classification Search
CPC ..... F16L 59/00; C09D 183/04; C09D 183/06; C09D 7/45; C09D 7/65; C09D 5/00; C08J 2383/06; C08J 5/18; C08G 77/20; C08G 77/045

See application file for complete search history.

(56) References Cited

U.S. PATENT DOCUMENTS

| | | | |
|---|---|---|---|
| 6,423,772 B1 * | 7/2002 | Zhang | ................. C08G 77/50 524/237 |
| 6,471,761 B2 | 10/2002 | Fan et al. | |
| 6,673,246 B2 | 1/2004 | Markowitz et al. | |
| 6,913,832 B2 | 7/2005 | Fan et al. | |
| 9,758,624 B2 | 9/2017 | Tang et al. | |
| 9,796,878 B2 | 10/2017 | Huang et al. | |
| 2012/0193286 A1 | 8/2012 | Prissok et al. | |
| 2012/0270063 A1 | 10/2012 | Casu et al. | |
| 2014/0058012 A1 * | 2/2014 | McCormack | ........ C09D 183/06 523/425 |
| 2014/0170403 A1 | 6/2014 | Tang et al. | |
| 2014/0174321 A1 * | 6/2014 | Huang | ................. C09D 183/06 106/287.11 |

FOREIGN PATENT DOCUMENTS

| | | |
|---|---|---|
| CN | 101024691 A | 8/2007 |
| CN | 102382554 A | 3/2012 |
| CN | 103880022 A | 6/2014 |
| CN | 103897586 A | 7/2014 |
| CN | 104269559 A | 1/2015 |
| CN | 104583349 A | 4/2015 |
| CN | 104745075 A | 7/2015 |
| EP | 2339119 A1 | 6/2011 |
| ES | 2533235 T3 | 4/2015 |
| JP | 2013-507502 A | 3/2013 |
| JP | 2014-47217 A | 3/2014 |
| KR | 10-2012-0100986 A | 9/2012 |
| TW | I490254 B | 7/2015 |
| TW | I594947 B | 8/2017 |
| TW | I598416 B | 9/2017 |
| WO | WO 2011/045306 A1 | 4/2011 |

(Continued)

OTHER PUBLICATIONS

Brinker et al., "Evaporation-Induced Self-Assembly: Nanostructures Made Easy," Advanced Materials, vol. 11, No. 7, 1999, pp. 579-585.
Huang et al., "Prediction of Thermal Conductivity of Aluminum Nanocluster-Filled Mesoporous Silica (Al/MCM-41)," Int. J. Thermophys., vol. 34, 2013 (published online Sep. 21, 2011), pp. 2371-2384.
Lian et al., "A Hierarchal Study on Load/Release Kinetics of Guest Molecules into/from Mesoporous Silica Thin Films," The Journal of Physical Chemistry, vol. 115. Mar. 22, 2011, pp. 6581-6590.

(Continued)

*Primary Examiner* — Christopher M Rodd
(74) *Attorney, Agent, or Firm* — Birch, Stewart, Kolasch & Birch, LLP

(57) ABSTRACT

A method of forming a thermal insulation porous film includes mixing 100 parts by weight of polysilsesquioxane-containing polymer, 20 to 75 parts by weight of surfactant, and 20 to 2000 parts by weight of solvent to form a thermal insulation coating material, wherein the polysilsesquioxane-containing polymer in the thermal insulation coating material is tube-shaped or sheet-shaped. The thermal insulation coating material is coated on a substrate, and then dried and sintered to form a thermal insulation porous film.

9 Claims, 1 Drawing Sheet

(56) References Cited

FOREIGN PATENT DOCUMENTS

| WO | WO 2011/076446 A1 | 6/2011 |
| WO | WO 2015/138141 A1 | 9/2015 |
| WO | WO 2016/014486 A1 | 1/2016 |

OTHER PUBLICATIONS

Ma et al., "Fabrication of Graphene Films with High Transparent Conducting Characteristics," Nanoscale Research Letters, 2013, vol. 8, No. 440, pp. 1-6.
Renteria et al., "Strongly Anisotropic Thermal Conductivity of Free-Standing Reduced Graphene Oxide Films Annealed at High Temperature," Advanced Functional Materials, vol. 25, pp. 4664-4672.
Taiwanese Office Action for Appl. No. 106125484 dated Aug. 10, 2018.
Torad et al., "Novel Block Copolymer Templates for Tuning Mesopore Connectivity in Cage-Type Mesoporous Silica Films," Journal of Materials Chemistry, vol. 22, 2012, pp. 20008-20016.

\* cited by examiner

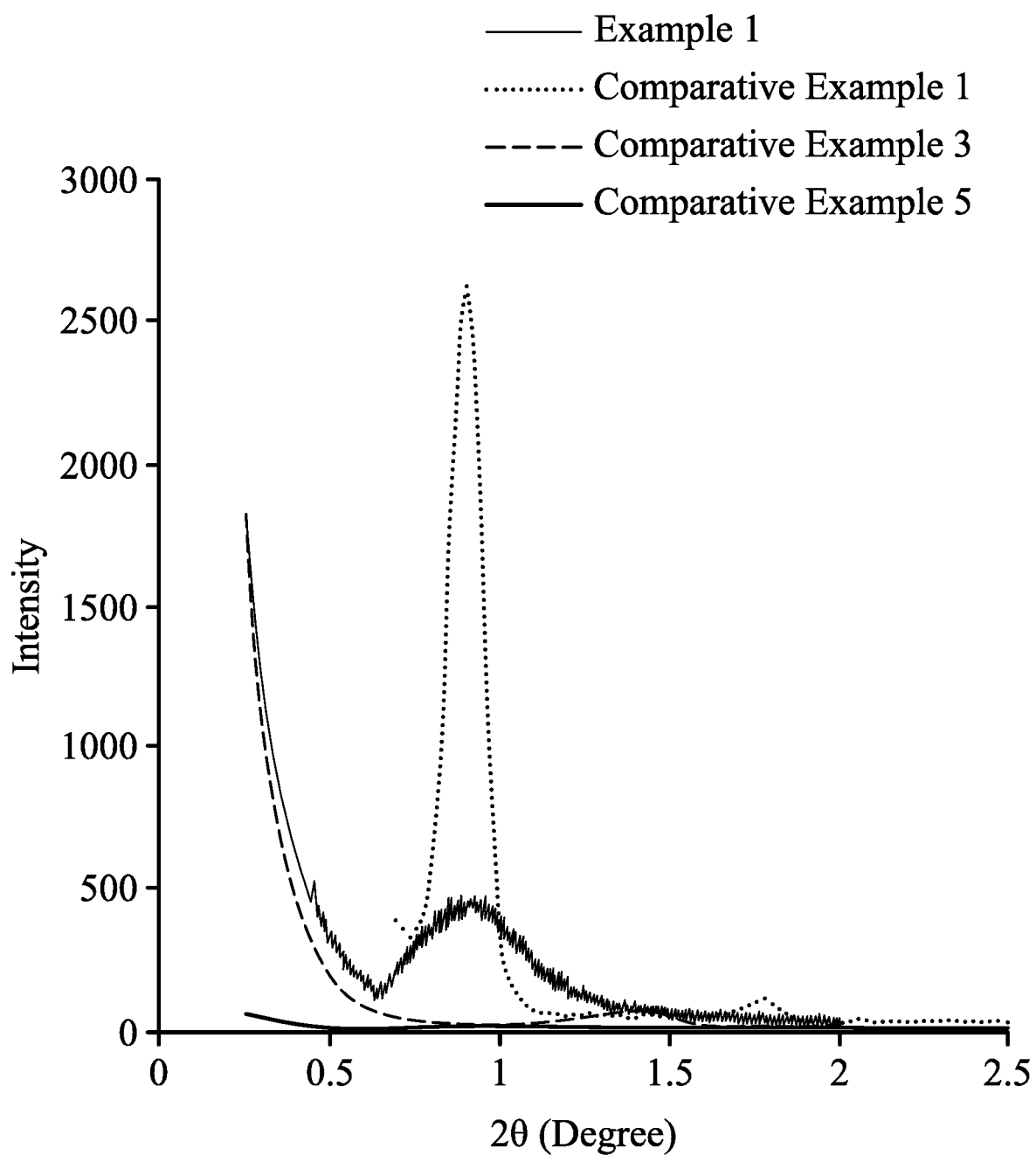

THERMAL INSULATION POROUS FILM, AND METHOD FOR MANUFACTURING THE SAME

CROSS REFERENCE TO RELATED APPLICATIONS

This application is a Divisional of pending U.S. patent application Ser. No. 16/046,423 filed on Jul. 26, 2018 and entitled "Thermal insulation coating material, thermal insulation porous film, and method for manufacturing the same", which is based on, and claims priority from, Taiwan Application Serial Number 106125484, filed on Jul. 28, 2017, the disclosure of which is hereby incorporated by reference herein in its entirety.

TECHNICAL FIELD

The technical field relates to a thermal insulation porous film, and in particular it relates to a thermal insulation coating material for forming the thermal insulation porous film.

BACKGROUND

As awareness about the environment and global warming raises, the reduction of energy consumption (especially in the construction industry) has attracted much attention. According to IEA statistics, global energy consumption is about 8428 Mtoe, with buildings consuming the most energy (about 33%). Lowering the indoor temperature in summer and raising the indoor temperature in winter in ways that reduce the amount of energy consumed by air conditioning units is an important topic, especially as regards buildings constructed largely of metal building materials, which can have a high thermal conductivity (k=30 W/m·K to 237 W/m·K) Reducing the thermal conductivity of the metal building material can help to reduce the transfer of heat from outdoors to indoors in summer, and help to prevent warm air from being transferred from indoors to outdoors in winter, thereby saving energy.

Conventional thermal insulation coating materials have limited energy-saving effects due to their high thermal conductivity (k=0.15 W/m·K to 0.3 W/m·K). High efficient thermal insulation materials (e.g. aerosol) may have a thermal conductivity of 0.01 W/m·K, but they cannot be continuously coated on metal building materials and chalking. In other words, highly efficient thermal insulation materials with a high cost and low bending endurance are difficult to process, and cannot be applied on building materials. Mesoporous thermal insulation materials have a lower thermal conductivity (0.017 W/m·K to 0.2 W/m·K) and can be applied in metal coating process. However, mesoporous thermal insulation materials are based on oxide of tetraethoxysilane, have a poor bending endurance after being sintered, and cannot be continuously coated. Accordingly, a thermal insulation building material is called for to meet the requirements of low thermal conductivity, low cost, flexibility, and continuous coatability.

SUMMARY

One embodiment of the disclosure provides a thermal insulation coating material, including: 100 parts by weight of tube-shaped or sheet-shaped polysilsesquioxane-containing polymer; 20 to 75 parts by weight of surfactant; and 20 to 2000 parts by weight of solvent.

One embodiment of the disclosure provides a thermal insulation porous film, including: a plurality of tube-shaped or sheet-shaped polysilsesquioxane-containing polymer regularly arranged in the X-Y plane, wherein an axis of the tube-shaped polysilsesquioxane-containing polymer or a sheet surface of the sheet-shaped polysilsesquioxane-containing polymer is substantially parallel to the X-Y plane.

One embodiment of the disclosure provides a method of forming a thermal insulation porous film, including: mixing 100 parts by weight of polysilsesquioxane-containing polymer, 20 to 75 parts by weight of surfactant, and 20 to 2000 parts by weight of solvent to form a thermal insulation coating material, wherein the polysilsesquioxane-containing polymer in the thermal insulation coating material is tube-shaped or sheet-shaped; coating the thermal insulation coating material on a substrate; and drying, sintering, or drying and then sintering the thermal insulation coating material to form a thermal insulation porous film.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows XRD spectra of coatings in embodiments of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In one embodiment, 100 parts by weight of polysilsesquioxane-containing polymer, 20 to 75 parts by weight of surfactant, and 20 to 2000 parts by weight of solvent are mixed to form a thermal insulation coating material. The polysilsesquioxane-containing polymer in the thermal insulation coating material is tube-shaped or sheet-shaped. In one embodiment, the polysilsesquioxane-containing polymer can be formed by reacting (a) polysilsesquioxane and (b) silane. In one embodiment, (a) polysilsesquioxane can be polymerized of $Si(R^1)_3(R^2)$, wherein each $R^1$ is independently hydroxyl or $C_{1-8}$ alkoxy group, and $R^2$ is $C_{1-12}$ alkyl group or $C_{6-12}$ aromatic group. In some embodiments, $Si(R^1)_3(R^2)$ can be methyltrimethoxysilane, methyltriethoxysilane, ethyltriethoxysilane, phenyltriethoxysilane, phenyltrimethoxysilane, or a combination thereof. In one embodiment, $Si(R^1)_3(R^2)$ may further polymerize with tetraalkoxy silane (e.g. tetramethoxysilane, tetraethoxysilane, another tetraalkoxy silane, or a combination thereof) to form polysilsesquioxane. In one embodiment, (a) polysilsesquioxane has a weight average molecular weight of 1800 to 45000. (a) Polysilsesquioxane having an overly low weight average molecular weight may cause an insufficient hardness of a coating layer. (a) Polysilsesquioxane having an overly high weight average molecular weight may result in an unstable solution, which will be solidified to gel at ambient temperature.

In one embodiment, (b) silane may have a structure of $Si(R^3)_2(R^4)(R^5)$, wherein each $R^3$ is independently hydroxyl or $C_{1-8}$ alkoxy group, $R^4$ is hydroxyl, $C_{1-8}$ alkyl group, or $C_{1-8}$ alkoxy group, and $R^5$ is $C_{3-12}$ epoxy group, $C_{3-12}$ acrylate group, $C_{3-12}$ alkyl acrylic acid group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, or $C_{3-12}$ alkenyl group. In one embodiment, (b) silane can be 2-(3,4-epoxycyclohexyl)-ethyltrimethoxysilane), 3-glycidoxypropyltrimethoxysilane, 3-glycidoxypropyl methyl diethoxysilane, 3-glycidoxypropyl triethoxysilane, 3-methacryloxypropyl methyldimethoxysilane, 3-methacryloxypropyl trimethoxysilane, 3-methacryloxypropyl methyldiethoxysilane, 3-methacryloxypropyl triethoxysilane, N-2-(aminoethyl)-3-aminopropylmethyldimethoxy silane, N-2-(aminoethyl)-3-aminopropyltrimethoxysilane, 3-aminopropyltrimethoxysilane, 3-aminopropyltriethoxysilane, N-phenyl-3-aminopropyltrimethoxysilane, 3-ureidopropyltriethoxysilane, 3-isocyanatepropyltriethoxysilane, 3-chloropropyltrimethoxysilane, 1H,1H,2H,2H-perfluorooctyltriethoxysilane, (heptadecafluoro-1,1,2,2-tetrahydrodecyl) triethoxysilane, 3-mercaptopropyltrimethoxysilane, 3-mercaptopropylmethyldimethoxysilane, bis(triethoxysilylpropyl)tetrasulfide, or 3-acryloxypropyl trimethoxysilane.

In one embodiment, (a) polysilsesquioxane and (b) silane have a weight ratio of 1:10 to 10:1. Too little (b) silane (or even no silane) may form a film being easily cracked or having a poor bending endurance. Too much (b) silane causes an overly high organic amount, thereby lowering the mechanical properties such as hardness of the coating layer. In one embodiment, the polysilsesquioxane-containing polymer has a weight average molecular weight of 1900 to 50000. Polymer having an overly low weight average molecular weight may cause an insufficient hardness of the coating layer. Polymer having an overly high weight average molecular weight may result in an unstable solution, which will be solidified to gel at ambient temperature.

The polysilsesquioxane-containing polymer can be mixed with the surfactant and the solvent (e.g. water and organic solvent) to form a thermal insulation coating material. The thermal insulation coating material may form a thermal insulation coating layer, in which the tube-shaped or sheet-shaped polysilsesquioxane-containing polymer are regularly arranged in the X-Y plane, and an axis of the tube-shaped polysilsesquioxane-containing polymer or a sheet surface of the sheet-shaped polysilsesquioxane-containing polymer is substantially parallel to the X-Y plane. In one embodiment, the polymer in the thermal insulation coating material is tube-shaped due to micelle phenomenon, wherein the surfactant and the organic solvent are inside the tube, and water is outside the tube. Alternatively, the polymer in the thermal insulation coating material is tube-shaped due to micelle phenomenon, wherein water and the surfactant are inside the tube, and the organic solvent outside the tube. The tube-shaped polymer may have an aspect ratio (the ratio of length and diameter) of 10 to $2\times10^5$ (e.g. 10 to 1000), and a diameter of 1 nm to 100 nm (e.g. 2 nm to 50 nm). In one embodiment, the polymer in the thermal insulation coating material is sheet-shaped. The sheet-shaped polymer may have a ratio of length (or width) to thickness of 10 to $2\times10^5$ (e.g. 10 to 1000). An overly low aspect ratio of the tube-shaped structure, or an overly low ratio of length (or width) to thickness of the sheet-shaped structure may reduce the thermal insulation effect of the coating layer. An overly high aspect ratio of the tube-shaped structure, or an overly high ratio of length (or width) to thickness of the sheet-shaped structure is unstable. An overly short diameter of the tube-shaped structure or an overly thin thickness of the sheet-shaped structure easily forms a structure of non-continuous pores, which cannot achieve the thermal insulation effect. An overly long diameter of the tube-shaped structure or an overly thick thickness of the sheet-shaped structure also reduces the thermal insulation effect.

As described above, the polysilsesquioxane-containing polymer and the surfactant in the thermal insulation coating material may have a weight ratio of 100:20 to 100:75, such as 100:30 to 100:70. Too little the surfactant (or even no surfactant) cannot form the tube-shaped or sheet-shaped polymer, and the polymer in a coating layer formed from the coating material will not arranged in the X-Y plane, such that the coating layer lacks the thermal insulation property (especially the low thermal conductivity in the Z axis). In one embodiment, the surfactant can be amphiphilic non-ionic surfactant or amphiphilic ionic surfactant. For example, the amphiphilic non-ionic surfactant can be a block copolymer or a graft copolymer of polydimethylsiloxane and polyethylene glycol, polyethylene glycol and polypropylene glycol, or polyethylene glycol and polyethylene. The amphiphilic non-ionic surfactant can be also a polyethylene alkylamine (e.g. polyethylene glycol dodecyl amine, polyethylene glycol stearyl amine, or polyethylene glycol oleyl amine), ethoxylated amide, ethoxylated alkyl alkanol amide, alkyl polyglucose, ethoxylated ester, diester of alkyl polyglucose, or a combination thereof. In one embodiment, the amphiphilic ionic surfactant can be alkyl sultaine, alkyl ether hydroxyl propyl sultaine, alkyl dimethyl sultaine, alkyl amidopropyl sultaine, alkyl sulfosultaine, or alkylamidopropyl hydroxyl sulfosultaine, wherein the alkyl is $C_{6-22}$ alkyl group. The other amphiphilic ionic surfactant of the embodiments of the disclosure may include (but are not limited to) dihydroxyl alkyl glycinate, dicarboxyl imidazoline derivative such as alkyl ether hydroxyl propyl sulfosultaine, cocoyl amphoteric acetate, cocoyl amido propyl hydroxyl sulfosultaine, sodium lauriminodipropionate, or a combination thereof.

As described above, the polysilsesquioxane-containing polymer and the solvent in the thermal insulation coating material have a weight ratio of 100:20 to 100:2000. Too little solvent results in an unstable coating material. Too much solvent cannot form a regular arrangement. In one embodiment, the organic solvent can be alcohol such as isopropyl alcohol, ethanol, or methanol, ester such as ethyl acetate or ethyl formate, water, or a combination thereof. The solvent should be compatible with the surfactant to prevent phase separation. If phase separation occurs, the polymer cannot form a tube-shaped or sheet-shaped structure. In one embodiment, water and the organic solvent have a weight ratio of 1:0.01 to 1:200.

The thermal insulation coating material is then coated on a substrate, and dried to form a thermal insulation coating layer with a low thermal conductivity in the Z axis (e.g. a thermal insulation porous film). In one embodiment, the substrate can be plate, foil, roll, wire, or tube, which can be composed of metal, concrete, plastic or alloy (e.g. stainless steel plate or metal foil). In one embodiment, the thermal insulation coating material can be coated by screen printing, spin coating, bar coating, blade coating, roller coating, dip coating, spray coating, brush coating, or a combination thereof. The coated thermal insulation coating material can be dried by heating, air-drying, vacuum, or a combination thereof, which is determined by the application. The step of drying the thermal insulation coating material may remove the solvent in the pores, and the surfactant is remained in the insulation porous film. In one embodiment, the thermal insulation coating material is dried at a temperature of 50° C. to 250° C. An overly low drying temperature cannot remove the solvent, which may increase the thermal conductivity in the Z axis of the coating layer. In one embodiment, the thermal insulation layer can be further sintered at a temperature of 250° C. to 350° C. After the sintering, the surfactant inside the tube-shaped or sheet-shaped polymer can be removed, and the tube-shaped or sheet-shaped polymer is kept in the coating layer to form the thermal insulation porous film. An overly low sintering temperature cannot remove the surfactant, and the residual surfactant may increase the thermal conductivity in the Z axis of the coating layer. An overly high sintering temperature may form a brittle coating layer without flexibility. Alternatively, the thermal insulation coating material can be directly sintered (without being pre-dried) for removing the solvent and the surfactant to form the thermal insulation coating. On the other hand, the coating layer can be treated before being sintered, and the treatment can be either UV exposure or dipping in solvent for undermining the surfactant. As such, the treatment may be beneficial to remove more surfactant.

Because the polysilsesquioxane-containing polymer is a Si—O bonding based polymer, the thermal insulation coating layer formed from the thermal insulation coating material has high climate resistance and mechanical strength. The polymer has specific function groups with high carbon number (e.g. such as $C_{3-12}$ epoxy group, $C_{3-12}$ acrylate group, $C_{3-12}$ alkyl acrylic acid group, $C_{3-12}$ aminoalkyl group, $C_{3-12}$ isocyanate-alkyl group, $C_{3-12}$ alkylcarboxylic acid group, $C_{3-12}$ alkyl halide group, $C_{3-12}$ mercaptoalkyl group, $C_{3-12}$ alkenyl group, or the like), such that the thermal insulation coating material has a higher film formability, and the coating layer formed from the coating material has a flexibility. In addition, the surfactant may make the polymer in the thermal insulation coating material be a tube-shaped structure or a sheet-shaped structure, and the tube-shaped or sheet-shaped polymer in the coating layer is regularly arranged in the X-Y plane (e.g. the axis of the tube-shaped structure and the sheet surface of the sheet-shaped structure is substantially parallel to the X-Y plane). As such, the thermal conductivity in the Z axis of the coating layer can be reduced. In one embodiment, the coating layer (such as the porous film) has a porosity of 30% to 85%, e.g. 50% to 80%. A coating layer with an overly low porosity has poor thermal insulation property. A coating layer with an overly high porosity has poor physical properties such as hardness or bending endurance. In one embodiment, the coating layer (such as the porous film) has a thickness of 1 micrometer to 10 millimeters. An overly thin coating layer cannot achieve the thermal insulation effect. An overly thick coating layer is easily cracked. In one embodiment, the porous film has a thermal conductivity in the X-Y plane of 0.4 W/m·K to 100 W/m·K, and a thermal conductivity in the Z axis of 0.01 W/m·K to 0.1 W/m·K.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1 (Thermal Insulation Coating Layer, Porous Film)

5 g of HCl solution (1N), 38.2 g of de-ionized water, 53 g of isopropyl alcohol, and 51.6 g of methyl trimethoxysilane (MTMS) were evenly mixed and then reacted at 55° C. for 3 hours to obtain a polysilsesquioxane solution. Subsequently, 51.6 g of 3-methacryloxy propyl trimethoxysilane (MPMS, having a structure of

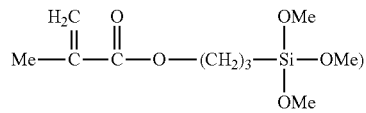

was mixed into the polysilsesquioxane solution, and then reacted with polysilsesquioxane at 55° C. for 3 hours to form a polysilsesquioxane-containing polymer (1). The solution of the polysilsesquioxane-containing polymer (1) had a solid content of about 20%.

2.5 g of poly(ethylene glycol)-block-poly(propylene glycol)-block-poly(ethylene glycol) (MW=5800, commercially available from Aldrich) serving as amphiphilic non-ionic surfactant was added into 10 g of ethanol, and then stirred with 22.8 g of the solution of the polysilsesquioxane-containing polymer (1) at room temperature for 1 hour to form a thermal insulation coating material. The thermal insulation coating material was coated on a stainless steel plate and dried at room temperature for 1 day, and then heated to 120° C. and kept at 120° C. for 1 hour. The heated coated layer was then exposed to UV under ozone for 10 minutes, and then dried at 350° C. for 10 minutes to obtain a thermal insulation coated layer (1).

The layer (1) was analyzed by X-ray diffraction (XRD), which had an obvious signal as shown in FIG. 1. It means that the tube-shaped polymers in the layer (1) were regularly arranged in the X-Y plane. Generally, a stronger XRD signal represents a more regular arrangement of the microscopic structure. The layer (1) was analyzed by scanning electron microscope (SEM), which had an obvious arrangement in the X-Y plane. The tube-shaped polymers in the layer (1) had a diameter of about 10 nm. The layer (1) had a thermal conductivity in the Z axis of 0.038 W/m·K and a thermal conductivity in the X-Y plane of 1.37 W/m·K, which were measured by the standard ISO 22007-2. The layer (1) could pass the bending test of 2 mm (e.g. the standard CNS 15200-5-1). Even if the dried coated layer (1) had a thickness over 20 μm, it still had an excellent appearance (no cracks) and flexibility.

Example 2 (Thermal Insulation Coating Layer, Porous Film)

3.1 g of poly(ethylene glycol)-block-poly(propylene glycol)-block-poly(ethylene glycol) serving as amphiphilic non-ionic surfactant was added into 12.4 g of ethanol, and then stirred with 22.8 g of the solution of the polysilsesquioxane-containing polymer (1) at room temperature for 1 hour to form a thermal insulation coating material. The thermal insulation coating material was coated on a stainless steel plate and dried at room temperature for 1 day, and then heated to 120° C. and kept at 120° C. for 1 hour. The heated coated layer was then exposed to UV under ozone for 10 minutes, and then dried at 350° C. for 10 minutes to obtain a thermal insulation layer (2). The tube-shaped polymers in the layer (2) had a diameter of about 40 nm. The layer (2) had a thermal conductivity in the Z axis of 0.025 W/m·K and a thermal conductivity in the X-Y plane of 1.95 W/m·K, which were measured by the standard ISO 22007-2. The layer (2) could pass the bending test of 2 mm (e.g. the standard CNS 15200-5-1). Even if the dried coated layer (2) had a thickness over 20 μm, it still had an excellent appearance (no cracks) and flexibility.

Example 3 (Thermal Insulation Coating Layer, Porous Film)

3.1 g of poly(ethylene glycol)-block-poly(propylene glycol)-block-poly(ethylene glycol) serving as amphiphilic non-ionic surfactant was added into 12.4 g of ethanol, and then stirred with 22.8 g of the solution of the polysilsesquioxane-containing polymer (1) at room temperature for 1 hour to form a thermal insulation coating material. The thermal insulation coating material was coated on a stainless steel plate and dried at room temperature for 1 day, and then heated to 120° C. and kept at 120° C. for 1 hour to obtain a thermal insulation layer (3). The tube-shaped polymers in the layer (3) had a diameter of about 40 nm. The layer (3) had a thermal conductivity in the Z axis of 0.091 W/m·K and a thermal conductivity in the X-Y plane of 0.54 W/m·K, which were measured by the standard ISO 22007-2. The layer (3) could pass the bending test of 2 mm (e.g. the standard CNS 15200-5-1). Even if the dried coated layer (3) had a thickness over 20 μm, it still had an excellent appearance (no cracks) and flexibility.

Example 4 (Thermal Insulation Coating Layer, Porous Film)

0.92 g of poly(ethylene glycol)-block-poly(propylene glycol)-block-poly(ethylene glycol) serving as amphiphilic non-ionic surfactant was added into 10 g of ethanol, and then stirred with 22.8 g of the solution of the polysilsesquioxane-containing polymer (1) at room temperature for 1 hour to form a thermal insulation coating material. The thermal insulation coating material was coated on a stainless steel plate and dried at room temperature for 1 day, and then heated to 120° C. and kept at 120° C. for 1 hour. The heated coating layer was then exposed to UV under ozone for 10 minutes, and then dried at 350° C. for 10 minutes to obtain a thermal insulation layer (4). The tube-shaped polymers in the layer (4) had a diameter of about 12 nm. The layer (4) had a thermal conductivity in the Z axis of 0.076 W/m·K and a thermal conductivity in the X-Y plane of 0.43 W/m·K, which were measured by the standard ISO 22007-2. The layer (4) could pass the bending test of 2 mm (e.g. the standard CNS 15200-5-1). Even if the dried coated layer (4) had a thickness over 20 μm, it still had an excellent appearance (no cracks) and flexibility.

Example 5 (Thermal Insulation Coating Lyer, Porous Film)

5 g of HCl solution (1N), 38.2 g of de-ionized water, 53 g of isopropyl alcohol, and 51.6 g of methyl trimethoxysilane (MTMS) were evenly mixed and then reacted at 55° C. for 3 hours to obtain a polysilsesquioxane solution. Subsequently, 51.6 g of 3-glycidoxy propyl trimethoxysilane (GPMS, having a structure of

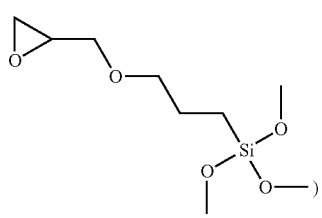

was mixed into the polysilsesquioxane solution, and then reacted with polysilsesquioxane at 55° C. for 3 hours to form a polysilsesquioxane-containing polymer (2). The solution of the polysilsesquioxane-containing polymer (2) had a solid content of about 20%.

2.5 g of poly(ethylene glycol)-block-poly(propylene glycol)-block-poly(ethylene glycol) (MW=5800, commercially available from Aldrich) serving as amphiphilic non-ionic surfactant was added into 10 g of ethanol, and then stirred with 22.8 g of the solution of the polysilsesquioxane-containing polymer (2) at room temperature for 1 hour to form a thermal insulation coating material. The thermal insulation coating material was coated on a stainless steel plate and dried at room temperature for 1 day, and then heated to 120° C. and kept at 120° C. for 1 hour. The heated coating layer was then exposed to UV under ozone for 10 minutes, and then dried at 350° C. for 10 minutes to obtain a thermal insulation layer (5). The layer (5) had a thermal conductivity in the Z axis of 0.073 W/m·K and a thermal conductivity in the X-Y plane of 0.775 W/m·K, which were measured by the standard ISO 22007-2. The layer (5) could pass the bending test of 2 mm (e.g. the standard CNS 15200-5-1). Even if the dried coated layer (5) had a thickness over 20 μm, it still had an excellent appearance (no cracks) and flexibility.

Comparative Example 1

0.7 g of poly(ethylene glycol)-block-poly(propylene glycol)-block-poly(ethylene glycol) serving as amphiphilic non-ionic surfactant was added into 5 g of ethanol, and then stirred with 2.65 g of tetraethoxyl silane (TEOS) and 1.35 g of HCl solution (1N) at room temperature for 3 hours to form a coating material. The coating material was coated on a stainless steel plate and dried at room temperature for 1 day, and then heated to 120° C. and kept at 120° C. for 1 hour to obtain a coated layer (6) with a thickness of 5 μm. The layer (6) had a cracked surface, such that its thermal conductivity and bending endurance could not be measured. The cracked layer (6) was further dried at 550° C. to obtain cracked powder, which was analyzed by XRD as shown in FIG. 1. The cracked powder had an obvious XRD signal, and it means that the cracked powder should have an arrangement in the X-Y plane.

Comparative Example 2

5 g of HCl solution (1N), 38.2 g of de-ionized water, 53 g of tetrahydrofuran (THF), and 51.6 g of methyl trimethoxysilane (MTMS) were evenly mixed and then reacted at 55° C. for 3 hours to obtain a polysilsesquioxane solution. Subsequently, 51.6 g of 3-methacryloxy propyl trimethoxysilane (MPMS, having a structure of

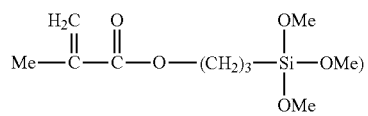

was mixed into the polysilsesquioxane solution, and then reacted with polysilsesquioxane at 55° C. for 3 hours to form a polysilsesquioxane-containing polymer (3). The solution of the polysilsesquioxane-containing polymer (3) had a solid content of about 20%.

2.5 g of poly(ethylene glycol)-block-poly(propylene glycol)-block-poly(ethylene glycol) serving as amphiphilic non-ionic surfactant was added into 10 g of ethanol, and then stirred with 22.8 g of the solution of the polysilsesquioxane-containing polymer (3) at room temperature for 1 hour to obtain a liquid. The liquid was obviously incompatible in appearance, which could not serve as a coating material.

Comparative Example 3

3.5 g of poly(ethylene glycol)-block-poly(propylene glycol)-block-poly(ethylene glycol) serving as amphiphilic non-ionic surfactant was added into 10 g of ethanol, and then stirred with 22.8 g of the solution of the polysilsesquioxane-containing polymer (1) at room temperature for 1 hour to form a coating material. The coating material was coated on a stainless steel plate and dried at room temperature for 1 day, and then heated to 120° C. and kept at 120° C. for 1 hour. The heated coating layer was then exposed to UV under ozone for 10 minutes, and then dried at 350° C. for 10 minutes to obtain a coated layer (7). The layer (7) was analyzed by XRD, which had no obvious signal as shown in FIG. 1. As such, no regular arrangement in the X-Y plane existed. The layer (7) had a thermal conductivity in the Z axis of 0.093 W/m·K and a thermal conductivity in the X-Y plane of 0.496 W/m·K, which were measured by the standard ISO 22007-2.

Comparative Example 4

2.5 g of poly(ethylene glycol)-block-poly(propylene glycol)-block-poly(ethylene glycol) serving as amphiphilic non-ionic surfactant was added into 10 g of ethanol, and then stirred with 22.8 g of the solution of the polysilsesquioxane-containing polymer (1) at room temperature for 1 hour to form a coating material. The coating material was coated on a stainless steel plate and dried at room temperature for 1 day, and then exposed to UV under ozone for 10 minutes to obtain a coated layer (8). The layer (8) was too soft, and the film formability was poor. As such, the tests such as thermal conductivity and the bending endurance could not be performed.

Comparative Example 5

22.8 g of the solution of the polysilsesquioxane-containing polymer (1) directly serving as a coating material was coated on a stainless steel plate and dried at room temperature for 1 day, and then heated to 120° C. and kept at 120° C. for 1 hour. The heated coating layer was then exposed to UV under ozone for 10 minutes, and then dried at 350° C. for 10 minutes to obtain a coated layer (9). The layer (9) had a thermal conductivity in the Z axis of 0.17 W/m·K and a thermal conductivity in the X-Y plane of 0.22 W/m·K, which were measured by the standard ISO 22007-2. The layer (9) could pass the bending test of 2 mm (e.g. the standard CNS 15200-5-1). Even if the dried coated layer (9) had a thickness over 20 μm, it still had an excellent appearance (no cracks) and flexibility. The layer (9) was analyzed by XRD, which had no obvious signal. As such, no regular arrangement in the X-Y plane existed. Moreover, the layer (9) did not have thermal insulation property.

Comparative Example 6

5 g of HCl solution (1N), 38.2 g of de-ionized water, 53 g of isopropyl alcohol, and 51.6 g of methyl trimethoxysilane (MTMS) were evenly mixed and then reacted at 55° C. for 3 hours to obtain a polysilsesquioxane solution. Subsequently, 51.6 g of 3-methacryloxy propyl trimethoxysilane (MPMS) was mixed into the polysilsesquioxane solution to form a liquid mixture of the polysilsesquioxane and the silane.

2.5 g of poly(ethylene glycol)-block-poly(propylene glycol)-block-poly(ethylene glycol) serving as amphiphilic non-ionic surfactant was added into 10 g of ethanol, and then stirred with 22.8 g of the mixture liquid of the polysilsesquioxane and the silane at room temperature for 1 hour to form a coating material. The coating material was coated on a stainless steel plate and dried at room temperature for 1 day, and then heated to 120° C. and kept at 120° C. for 1 hour to obtain a coated layer (10). The coated layer (10) was cracked, and tests such as XRD, thermal conductivity, and bending endurance could not be performed.

TABLE 1

| | Weight ratio between the surfactant and the polymer | Thermal conductivity in Z axis (W/m · K) | Thermal conductivity in X-Y plane (W/m · K) | Film formability | Bending test | Polymer regularly arranged in X-Y plane |
|---|---|---|---|---|---|---|
| Example 1 | 54.8:100 | 0.038 | 1.37 | Good (>20 μm) | Pass | Yes |
| Example 2 | 68.0:100 | 0.025 | 1.95 | Good (>20 μm) | Pass | Yes |
| Example 3 | 68.0:100 | 0.091 | 0.54 | Good (>20 μm) | Pass | Yes |
| Example 4 | 20.1:100 | 0.076 | 0.43 | Good (>20 μm) | Pass | Yes |
| Example 5 | 54.8:100 | 0.073 | 0.775 | Good (>20 μm) | Pass | Yes |
| Comparative Example 1 | — | — | — | Cracked (<5 μm) | — | Yes |
| Comparative Example 2 | 54.8:100 | — | — | Unstable solution | — | No |
| Comparative Example 3 | 76.8:100 | 0.093 | 0.496 | Good (>20 μm) | — | No |
| Comparative Example 4 | 54.8:100 | — | — | Not good (not dried) | — | — |

TABLE 1-continued

|  | Weight ratio between the surfactant and the polymer | Thermal conductivity in Z axis (W/m · K) | Thermal conductivity in X-Y plane (W/m · K) | Film formability | Bending test | Polymer regularly arranged in X-Y plane |
|---|---|---|---|---|---|---|
| Comparative Example 5 | 0:100 | 0.17 | 0.22 | Good (>20 μm) | Pass | No |
| Comparative Example 6 | 54.8:100 | — | — | Cracked (<5 μm) | — | — |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A thermal insulation porous film, comprising:
   a plurality of tube-shaped or sheet-shaped polysilsesquioxane-containing polymer regularly arranged in an X-Y plane,
   wherein an axis of the tube-shaped polysilsesquioxane-containing polymer or a sheet surface of the sheet-shaped polysilsesquioxane-containing polymer is substantially parallel to the X-Y plane.

2. The thermal insulation porous film as claimed in claim 1, wherein the polysilsesquioxane-containing polymer is formed by reacting (a) polysilsesquioxane and (b) silane.

3. The thermal insulation porous film as claimed in claim 1, having a thermal conductivity in the X-Y plane of 0.4 W/m·K to 100 W/m·K, and a thermal conductivity in a Z axis of 0.01 W/m·K to 0.1 W/m·K.

4. The thermal insulation porous film as claimed in claim 1, having a porosity of 30% to 85%.

5. The thermal insulation porous film as claimed in claim 1, having a thickness of 1 micrometer to 10 millimeters.

6. A method of forming a thermal insulation porous film, comprising:
   mixing 100 parts by weight of polysilsesquioxane-containing polymer, 20 to 75 parts by weight of surfactant, and 20 to 2000 parts by weight of solvent to form a thermal insulation coating material, wherein the polysilsesquioxane-containing polymer in the thermal insulation coating material is tube-shaped or sheet-shaped;
   coating the thermal insulation coating material on a substrate; and
   drying, sintering, or drying and then sintering the thermal insulation coating material to form a thermal insulation porous film.

7. The method as claimed in claim 6, wherein the polysilsesquioxane-containing polymer is formed by reacting (a) polysilsesquioxane and (b) silane.

8. The method as claimed in claim 6, wherein the thermal insulation porous film has a thermal conductivity in the X-Y plane of 0.4 W/m·K to 100 W/m·K, and a thermal conductivity in the Z axis of 0.01 W/m·K to 0.1 W/m·K.

9. The method as claimed in claim 6, wherein the surfactant comprises amphiphilic non-ionic surfactant or amphiphilic ionic surfactant.

* * * * *